Figure 1:
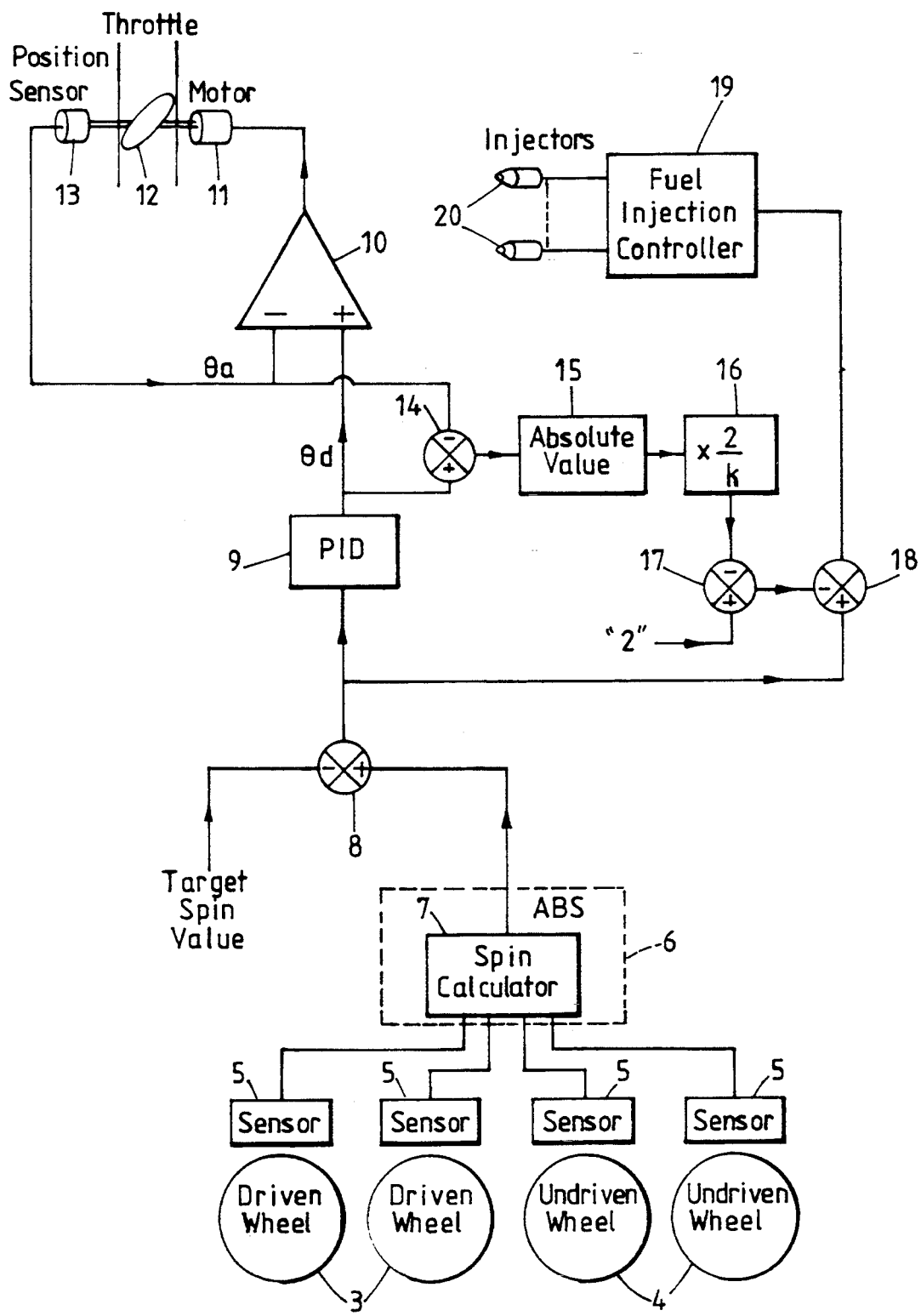

United States Patent
Bridgens

Patent Number: 5,369,586
Date of Patent: Nov. 29, 1994

[54] METHOD OF AND APPARATUS FOR CONTROLLING WHEEL SPIN

[75] Inventor: Barry J. Bridgens, West Midlands, England

[73] Assignee: Lucas Industries Public Limited Company, West Midlands, England

[21] Appl. No.: 805,569

[22] Filed: Dec. 12, 1991

[30] Foreign Application Priority Data

Jan. 5, 1991 [GB] United Kingdom ............... 9100224

[51] Int. Cl.$^5$ .............................. B60K 26/00
[52] U.S. Cl. ...................... 364/426.03; 364/431.05; 180/197; 123/325; 123/333; 123/481
[58] Field of Search ............... 364/426.01, 426.03, 364/426.02, 431, 05; 180/197; 123/325, 332, 333, 481

[56] References Cited

U.S. PATENT DOCUMENTS

| | | | |
|---|---|---|---|
| 4,778,025 | 10/1988 | Sakaguchi et al. | 180/197 |
| 4,790,275 | 12/1988 | Iida | 123/325 |
| 4,860,847 | 8/1989 | Shiraishi et al. | 180/197 |
| 4,873,638 | 10/1989 | Shiraishi et al. | 364/426.01 |
| 4,873,639 | 10/1989 | Sato et al. | 364/426.02 |
| 4,917,208 | 4/1990 | Komoda | 180/197 |
| 4,921,064 | 5/1990 | Wazaki et al. | 180/197 |
| 4,933,857 | 6/1990 | Hashiguchi et al. | 364/426.02 |
| 4,944,358 | 7/1990 | Wazaki et al. | 180/197 |
| 4,959,794 | 9/1990 | Shiraishi et al. | 364/426.03 |
| 5,012,882 | 5/1991 | Oono et al. | 180/197 |
| 5,019,989 | 5/1991 | Ueda et al. | 364/431.05 |
| 5,038,883 | 8/1991 | Kushi et al. | 180/197 |
| 5,046,009 | 9/1991 | Abo et al. | 364/426.02 |
| 5,076,385 | 12/1991 | Terazawa et al. | 180/197 |
| 5,137,105 | 8/1992 | Suzuki et al. | 180/197 |
| 5,163,530 | 11/1992 | Nakamura et al. | 180/197 |
| 5,168,952 | 12/1992 | Oono et al. | 180/197 |
| 5,172,319 | 12/1992 | Shiraishi et al. | 364/426.03 |

Primary Examiner—Thomas G. Black
Assistant Examiner—Collin W. Park
Attorney, Agent, or Firm—Dvorak and Traub

[57] ABSTRACT

In order to control wheel spin in a vehicle driven by an internal combustion engine, a spin calculator determines the amount of wheel spin and compares this with a target value. If the target value is exceeded, an engine controller reduces engine output demand, for instance by reducing the opening of a throttle. A fuelling controller forms a threshold value which is inversely dependent on the difference between the reduced engine output demand and the actual engine output demand. When the wheel spin exceeds the threshold value, the controller cuts off the supply of fuel for a predetermined pattern of engine fire events.

12 Claims, 2 Drawing Sheets

METHOD OF AND APPARATUS FOR CONTROLLING WHEEL SPIN

The present invention relates to a method of and an apparatus for controlling wheel spin.

Wheeled vehicles depend upon the maintenance of an adequate frictional contact between the driven wheels of the vehicle and the ground. When the driving force at the driven wheels exceeds a value which is related to the weight acting on the driven wheels and the co-efficient of friction of the ground surface, the driven wheels slip with respect to the ground, thus exhibiting the phenomenon known as wheel spin. During normal operation of a vehicle on surfaces of relatively high co-efficient of friction, such as dry tarmac, wheel spin is not a problem. However, on surfaces of relatively poor coefficient of friction, such as water logged tarmac, ice, and muddy surfaces, poor driving technique can give rise to wheel spin.

When a wheel spins excessively, the loss of proper frictional contact with the ground allows the wheel to slip sideways and, in extreme cases, can result in spinning or excessive yawing of the vehicle i.e. lateral instability. Small amounts of wheel spin do not result in substantial lateral instability and may even be beneficial for maximising acceleration of the vehicle or preventing damage to the vehicle transmission caused by careless or over-enthusiastic driving techniques. However, excessive amounts of wheel spin should be avoided and, for this purpose, so-called "traction control" systems have been developed.

In one known type of traction control system, when excessive wheel spin is detected, the system reduces the quantity of mixture supplied to the engine, for instance by at least partially closing a throttle of an induction system of the engine. However, a disadvantage of this system is that it has a relatively poor response time because of the time taken to close the throttle and the delay between closing the throttle and reduction of engine output.

Another known type of traction control system responds to excessive wheel spin by cutting off fuel for a predetermined pattern of engine fire events. Engine output is reduced with a much faster response time than for the previously mentioned system, but this technique of "fuel intervention" tends to increase the emissions of exhaust pollutants.

According to a first aspect of the invention, there is provided an apparatus for controlling wheel spin for a vehicle driven by an internal combustion engine, comprising means for detecting when wheel spin exceeds a predetermined threshold, means responsive to the detection means for producing a reduced engine demand, means for forming a threshold value which is inversely dependent on the difference between the reduced engine demand and actual engine demand, and means for cutting off the supply of fuel for a predetermined pattern of engine fire events when the wheel spin exceeds the threshold value.

According to a second aspect of the invention, there is provided a method of controlling wheel spin for a vehicle driven by an internal combustion engine, comprising detecting when wheel spin exceeds a predetermined threshold, producing a reduced engine demand, forming a threshold value which is inversely dependent on the difference between the reduced engine demand and actual engine demand, and cutting off the supply of fuel for a predetermined pattern of engine fire events when the wheel spin exceeds the threshold value.

The reduced and actual engine demands may be reduced and actual engine throttle demands. Alternatively the reduced and actual engine demands may be reduced and actual engine air mass flow demand. In the case of throttle demand, the reduced engine throttle demand and the actual engine throttle demand may comprise a reduced throttle angle demand and an actual throttle angle.

The term "inversely dependent" as used herein means that the threshold value is relatively small for relatively large differences between the reduced and actual engine throttle demands and is relatively large for relatively small differences.

Preferably the threshold value is a linear function of the difference. For instance, the threshold value may be proportional to the difference between a constant and the difference between the reduced and actual engine throttle demands.

It is thus possible to provide a traction control system having a rapid response time but causing relatively small and transient increases in emissions of exhaust pollutants. For relatively small amounts of excessive wheel spin, engine output is reduced by reducing the throttle or air mass flow demand signal and, for many instances, fuelling intervention is not required. For larger amounts of excessive wheel spin, the system calls for a larger reduction in engine output demand, but an engine throttle or the like can respond only relatively slowly to the reduced demand. Thus, a lower fuelling intervention threshold is set and fuelling intervention is used to reduce engine output with a relatively rapid response. As the actual demand approaches the reduced demand and/or as the amount of excessive wheel spin is reduced, the fuelling intervention threshold increases so that, for most of the time, wheel spin is reduced or eliminated by reducing the demand. Thus, fuelling intervention acts transiently in order to ensure that the traction control system has a relatively rapid response time but without greatly increasing the level of emissions of exhaust pollutants.

Figure 2:
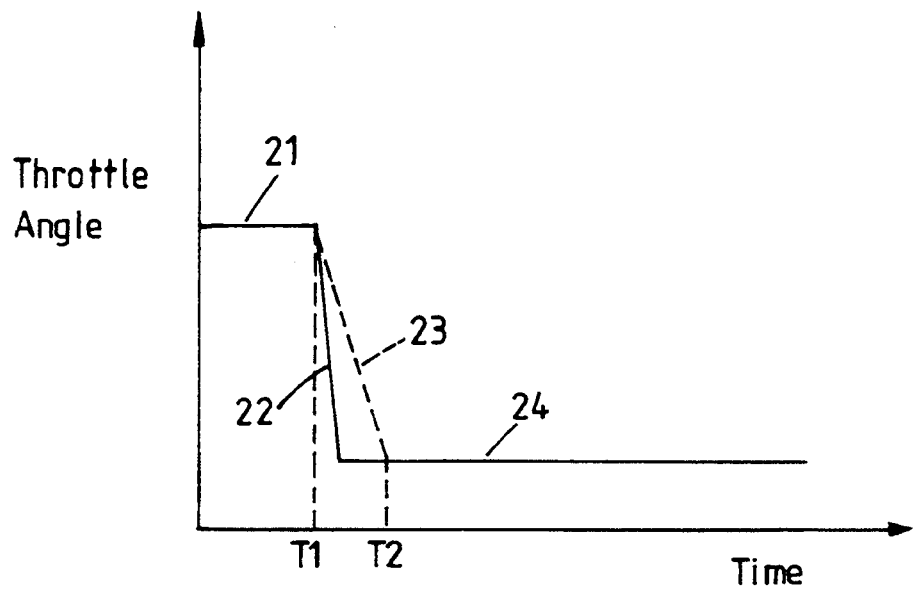
Figure 3:
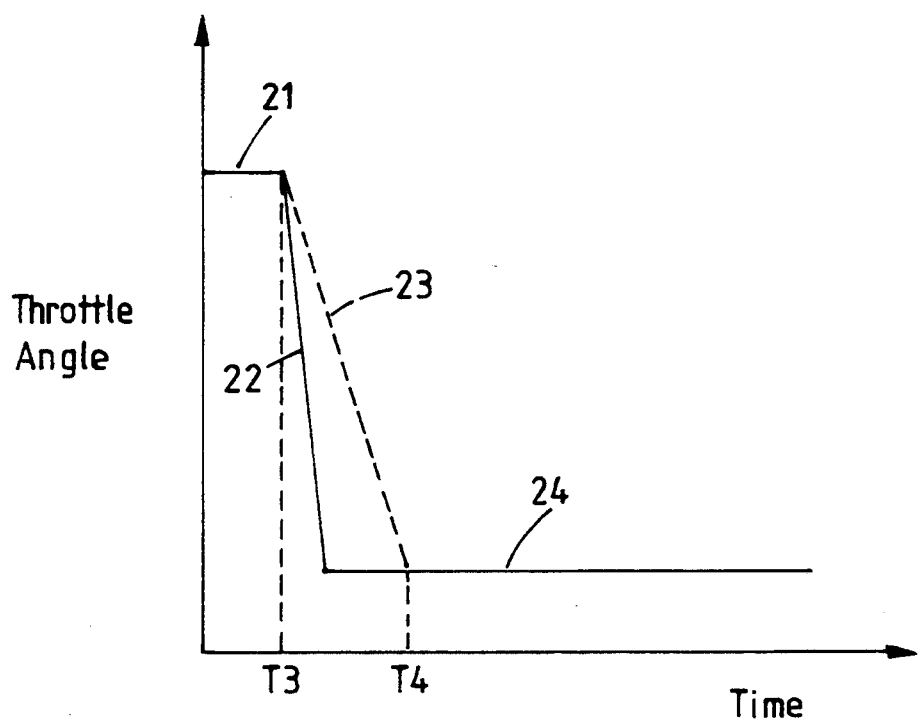

The present invention will be further described, by way of example, with reference to the accompanying drawings, in which:

FIG. 1 is a schematic diagram of a traction control system constituting an embodiment of the invention; and FIGS. 2 and 3 are graphs of throttle angle against time illustrating operation of the system of FIG. 1.

A vehicle is driven by an internal combustion engine (not shown) controlled by an engine management system including a traction control system as shown in FIG. 1. The vehicle has a pair of driven wheels 3 connected by a transmission (not shown) to the engine. The vehicle also has a pair of undriven wheels 4.

The wheels 3 and 4 are provided with respective sensors 5, such as variable reluctance transducers co-operating with toothed wheels, which provide signals representing the speeds of the wheels. The wheel speed signals are supplied to an anti-lock brake system 6 which includes a spin calculator 7 for providing an output signal representing the amount of wheel spin detected. For instance, the spin calculator 7 compares the speeds of the driven wheels 3 with the speeds of the undriven wheels 4 in order to detect excessive driven wheel speed and supplies a spin signal corresponding to the difference between driven wheel speed and undriven wheel speed.

In the case of a vehicle which does not have an antilock brake system, the spin calculator 7 and the sensors 5 may be provided in order to permit traction or wheel spin control. Also, wheel spin may be determined in other ways, for instance, by comparing the speed of each wheel with an average speed of all wheels or by comparing wheel speed with vehicle speed determined by a speed over ground sensor or the like. Wheel spin control may also be provided for all-wheel drive vehicles, for instance using one of the above mentioned alternative wheel spin detection techniques in place of the comparison with undriven wheel speed illustrated in the drawings.

The output of the spin calculator 7 is supplied to the summing input of a subtracter 8 whose subtracting input receives a target spin value. The output of the subtracter 8 is supplied to a proportional/integral/differential (PID) controller 9 which has a transfer function having a linear combination of proportional, integral and differential terms. The output of the controller 9 supplies a signal $8d$ representing a reduced throttle angle demand value, which is supplied to the non-inverting input of an amplifier 10 forming part of a servo feedback throttle angle controller. The output of the amplifier 10 is supplied to a motor 11, whose output shaft is coupled to a throttle 12 within an induction system of the engine. The angular position of the throttle 12 is sensed by a position sensor 13, such as a potentiometer, which supplies an output signal $8a$ representing the actual throttle angle to the inverting input of the amplifier 10.

The demanded and actual throttle angle values are supplied to the summing and subtracting inputs of a subtracter 14, whose output is supplied to an absolute value circuit 15. The Output of the circuit 15 is supplied to a multiplier 16, which multiplies the absolute value of the difference between the demanded and actual throttle angles by a constant $2/k$. The output of the multiplier 16 is supplied to the subtracting input of a subtracter 17, whose summing input receives a signal representing 2.

The output of the subtracter 17 forms a fuel intervention threshold value which is supplied to the subtracting input of a subtracter 18, whose summing input is connected to the output of the subtracter 8. The output of the subtracter 18 is connected to the input of a fuel injection controller 19, which has a plurality of outputs for controlling the operation of fuel injectors 20.

During normal operation in the absence of excessive wheel spin i.e. when the wheel spin calculated by the calculator 7 is less than the target spin value, the traction control system is disabled and engine operation is controlled by the engine management system in the normal way. However, when wheel spin exceeds the target spin value, the traction control system shown in FIG. 1 takes control of the engine management system in order to reduce or eliminate wheel spin. Throttle intervention effectively operates with zero threshold and responds to the detection of any excessive wheel spin. The controller 9 responds to the wheel spin by providing a reduced throttle angle demand $8d$ which causes the servo feedback control arrangement to reduce the opening angle of the throttle 12 by an amount which is dependent on the degree of wheel spin.

Because of inertia and other mechanical factors, the throttle 12 cannot respond instantly to the reduced throttle angle demand and, as is known, the difference between actual and demanded throttle angles drives the servo, which closes the throttle to the reduced demanded angle as quickly as possible within constraints, such as loop stability and minimal overshoot. The absolute value of the difference between the demanded and actual throttle angles is multiplied by the constant factor $2/k$ and subtracted from the constant value 2 in order to form a variable threshold signal for fuelling intervention. Thus, whereas the throttle intervention acts with a zero wheel spin threshold, the fuelling intervention acts when wheel spin in kilometers per hour exceeds a threshold value T in kilometers per hour given by:

$$T = 2 - 2(\theta d - \theta a)/k$$

The constant k is chosen so that the expression $(\theta d - \theta a)$ has a value between 0 and 1. For instance, the value of the constant k may be equal to the value of the total angular range of movement of the throttle 12.

Thus, for relatively small differences between the demanded and actual throttle angles, fuelling intervention operates when wheel spin exceeds a threshold of approximately two kilometers per hour. This is typical in the case of relatively small reductions in throttle angle, for instance when relatively small levels of excessive wheel spin are detected. Thus, fuelling intervention does not operate or operates for only relatively small periods.

For larger values of wheel spin, a larger reduction in throttle angle is demanded and the fuelling intervention threshold T is thus reduced. Fuelling intervention thus takes place so as to provide a rapid reduction in engine output in order to give the traction control system a rapid response. As the wheel spin reduces and/or as the fuelling intervention threshold T increases (as the actual throttle angle approaches the desired throttle angle), fuelling intervention is reduced and eventually disabled, after which wheel spin is controlled by throttle intervention.

The fuel injection controller 19 controls the fuel injectors 20 so as to cut off fuelling for a predetermined pattern of cylinder events or fire periods. For instance, the technique described in European Patent Specification No. 0 443 785 may be used for this purpose in order to reduce engine output rapidly and in a predictable manner.

The traction control system is thus capable of responding rapidly by, if necessary, using fuelling intervention for transient periods until throttle intervention control can take over. This is illustrated in FIGS. 2 and 3 of the accompanying drawings. FIG. 2 shows a relatively small reduced throttle angle demand from a throttle position shown at 21 for normal vehicle operation to a level shown at 24 for traction control in order to reduce or eliminate wheel spin. 22 indicates the part of the curve between the times T1 and T2. Thus, at time T1, the demanded throttle angle is reduced by the controller 9 relatively rapidly to the value represented by 24. However, the actual throttle angle as represented by the broken line 23 cannot respond sufficiently quickly to follow the demanded angle so that, between the times T1 and T2, there is a substantial difference between the actual and demanded throttle angles. During this time interval, the fuelling intervention threshold varies in accordance with the equation given above and, if the amount of wheel spin exceeds this threshold, engine output is reduced by fuelling intervention for a relatively short period of time. For smaller amounts of excessive wheel spin, no fuelling intervention is required.

FIG. 3 is a similar graph to FIG. 2 but illustrates operation for a much larger reduced throttle angle demand. In this case, a difference exists between the actual and demanded throttle angles for a much longer time interval from T3 to T4. Further, the greater reduction in throttle angle demand results in a much lower fuelling intervention threshold T, at least during an initial part of the time interval T3 to T4. Thus, for at least the initial part of this time interval, fuelling intervention is more likely to take place in order for the traction control system to provide a rapid response. As the level of excessive wheel spin falls and/or as the difference between demanded and actual throttle angles 22 and 23 falls so that the threshold T rises, fuelling intervention is less likely and eventually ceases so that subsequent traction control is performed by throttle intervention.

Thus, it is possible to provide a traction control system with a very rapid response to excessive wheel spin. The principal control strategy is throttle intervention with fuelling intervention acting transiently in order to decrease the traction control system response time whenever necessary. Because the fuelling intervention acts only transiently, exhaust emissions are not substantially increased.

What is claimed is:

1. An apparatus for controlling wheel spin for a vehicle driven by an internal combustion engine, comprising:
   detection means for detecting when wheel spin exceeds a first threshold;
   reduced engine demand producing means responsive to said detection means for producing a reduced engine demand;
   threshold forming means for forming a second threshold which is inversely dependent on a difference between the reduced engine demand and an actual engine demand; and
   fuel supply cutting means responsive to said detection means and said threshold value forming means for cutting off a supply of fuel for a predetermined pattern of engine fire events when the wheel spin exceeds the second threshold.

2. An apparatus as claimed in claim 1, in which said threshold forming means forms the second threshold as a linear function of the difference between the reduced engine demand and the actual engine demand.

3. An apparatus as claimed in claim 2, in which said threshold forming means forms the second threshold as a proportion of a difference between a constant and the difference between the reduced engine demand and the actual engine demand.

4. An apparatus as claimed in claim 1, in which the reduced engine demand and the actual engine demand are reduced throttle demand and actual throttle demand, respectively.

5. An apparatus as claimed in claim 1, in which the reduced engine demand and the actual engine demand are reduced engine air mass flow demand and actual engine air mass flow demand, respectively.

6. An apparatus as claimed in claim 1, in which said reduced engine demand producing means has a transfer function including at least one term selected from a list comprising proportional, integral, and differential terms.

7. A method of controlling wheel spin for a vehicle driven by an internal combustion engine, said method comprising the steps of:
   detecting when wheel spin exceeds a first threshold;
   producing a reduced engine demand in response to said detecting step;
   forming a second threshold which is inversely dependent on a difference between the reduced engine demand and an actual engine demand; and
   cutting a supply of fuel for a predetermined pattern of engine fire events when the wheel spin exceeds the second threshold.

8. A method as claimed in claim 7, in which said threshold forming step comprises forming the second threshold as a linear function of the difference between the reduced engine demand and the actual engine demand.

9. A method as claimed in claim 8, in which said threshold forming step comprises forming the second threshold as a proportion of a difference between a constant and the difference between the reduced engine demand and the actual engine demand.

10. A method as claimed in claim 7, in which the reduced engine demand and the actual engine demand are reduced throttle demand and actual throttle demand, respectively.

11. A method as claimed in claim 7, in which the reduced engine demand and the actual engine demand are reduced engine air mass flow demand and actual engine air mass flow demand, respectively.

12. A method as claimed in claim 9, in which said reduced engine demand producing step comprises producing the reduced engine demand in accordance with a transfer function including at least one term selected from a list comprising proportional, integral, and differential terms.

* * * * *